FIG. II

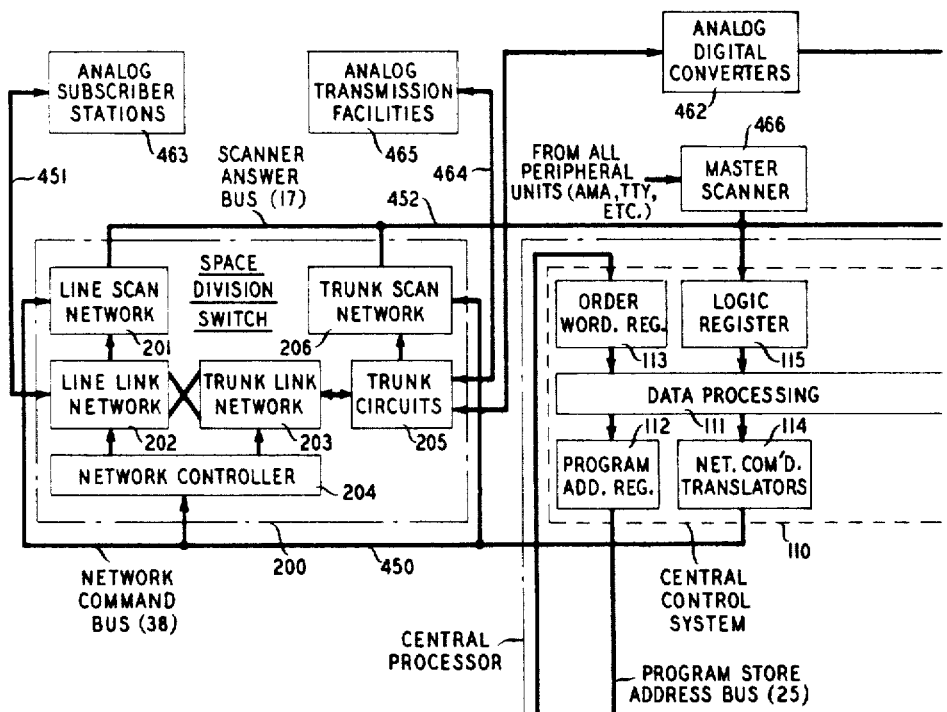
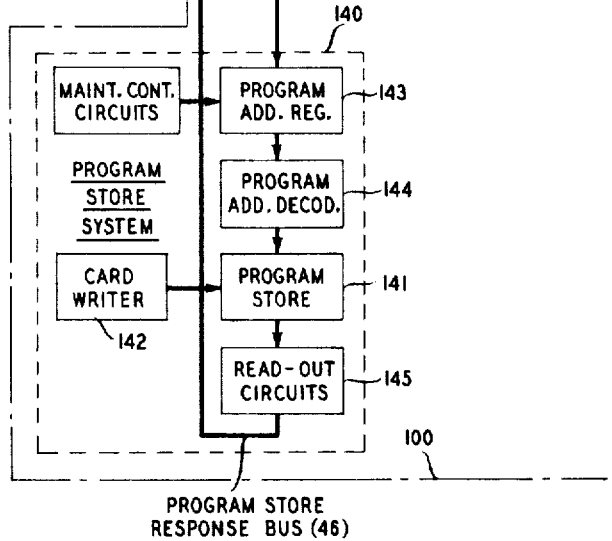

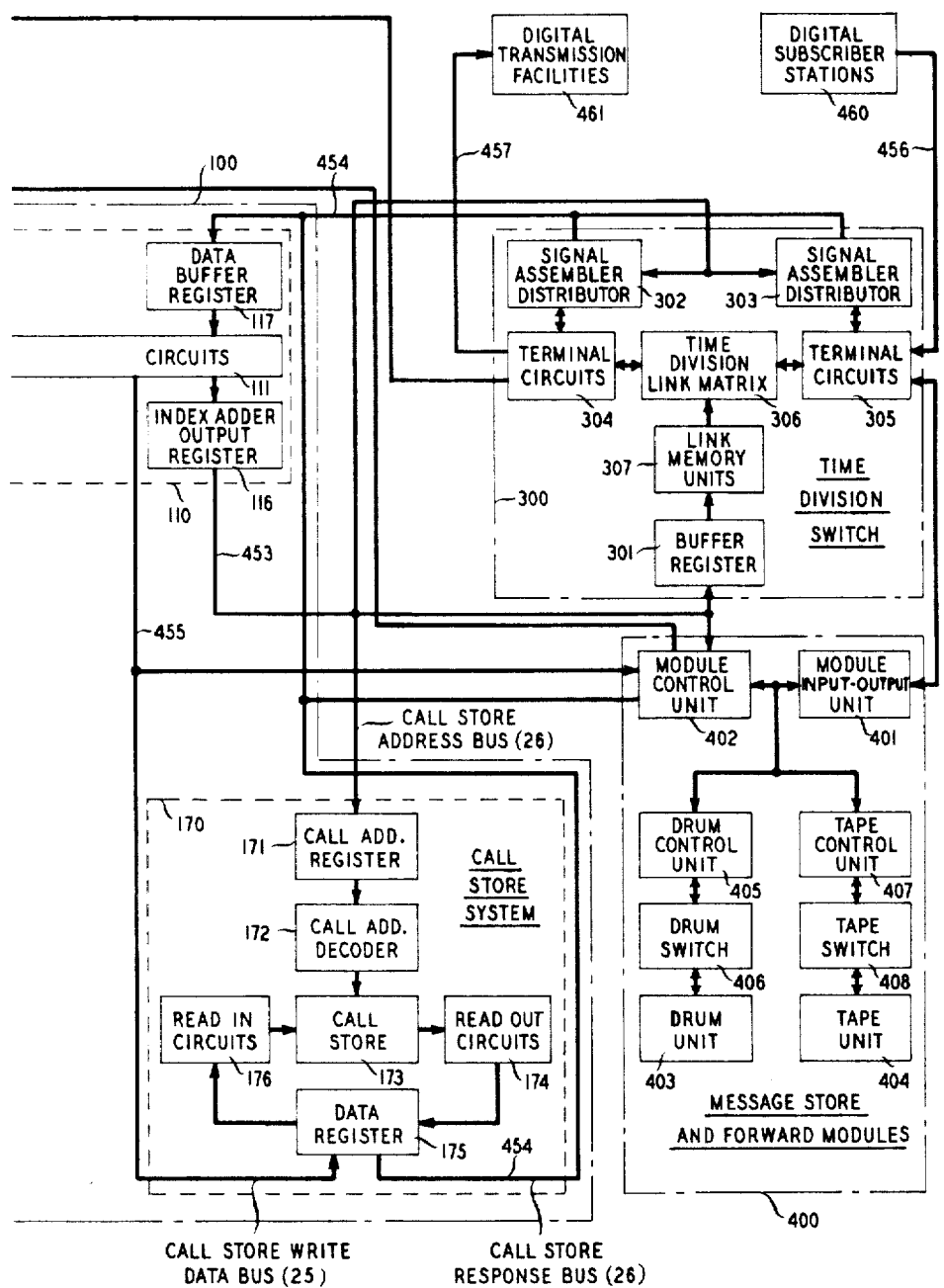

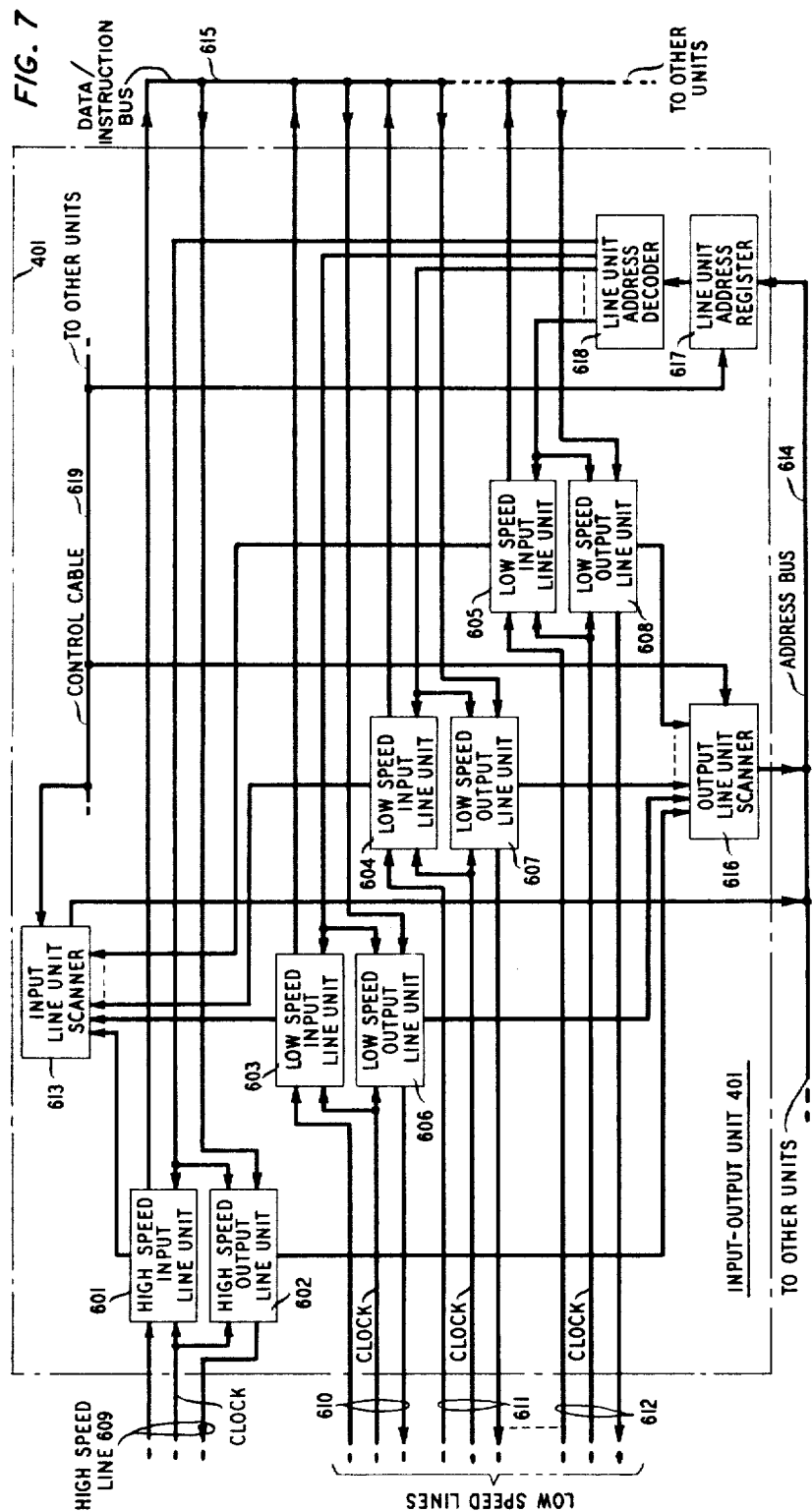

United States Patent Office 3,403,383
Patented Sept. 24, 1968

3,403,383
INTEGRATED ANALOG-DIGITAL SWITCHING SYSTEM WITH MODULAR MESSAGE STORE-AND-FORWARD FACILITIES
Harry G. Kienzle, Shrewsbury, and Roger E. Swift, Fair Haven, N.J., assignors to Bell Telephone Laboratories, Incorporated, New York, N.Y., a corporation of New York
Filed May 28, 1964, Ser. No. 371,135
14 Claims. (Cl. 340—172.5)

ABSTRACT OF THE DISCLOSURE

An integrated analog-digital electronically controlled telephone switching system is disclosed in which store-and-forward facilities are available to store digital messages and forward them at a later time to their destinations. Magnetic drum and tape storage units are disclosed together with control units all arranged on a modular basis for easy expansion of the store-and-forward capability. Multiple access to the various storage modules increases the reliability of message recovery.

---

This invention relates to switched signal communication systems and, more particularly, to integrated analog and digital message switching facilities employing electronic central processing and message store and forward capabilities.

Heretofore proposed electronic telephone switching facilities have been designed to provide switched connections to analog subscribers, and usually have encompassed only voice signals. In general, these systems operated by utilizing common control equipment whose operation is time-divided into cycles of successive time slots. An elemental operation can then be performed in each time slot at a sufficiently rapid rate so as to provide essentially continuous service to all subscribers. One such system is disclosed in the copending application of A. H. Doblmaier et al., Ser. No. 334,875, filed Dec. 31, 1963.

Numerous other systems have been devised to handle digital message signals, such as teletypewriter signals. Due to multiple addressing, automatic unattended transmission and reception, and various other factors, digital messages can be most conveniently handled on a store and forward basis. That is, calling subscribers are given access to the central office immediately upon request and the message is stored at the central office. When transmission trunks become available, or when the called subscriber becomes available, the message is then read out of the central office store and forwarded to the called subscriber or subscribers. This type of operation requires large amounts of message storage capacity at the central office, not required for analog switched communication.

The above-described analog and digital message switching facilities have heretofore always been provided separately, utilizing different switching facilities, different control equipment, different transmission facilities, and in most cases, physically separate switching center locations. As a result these systems have, for the most part, been incompatible and interconnection was possible only by means of very elaborate and expensive interface equipment.

It is an object of the present invention to integrate analog and digital message switching facilities.

It is a more specific object of the invention to control analog and digital message switching networks with a single electronic common control or central processor whose operation is divided into cycles of successive time slots sequentially utilized for all such control functions.

In accordance with this aspect of the present invention, a central processor is provided, similar to that of the above-named A. H. Doblmaier et al. application, in which the digital message processing equipment requests the services of, and is controlled by, the same central processor which, at other times, is controlling the analog message switching facilities. In particular, the digital message store and forward facilities initiate requests for service which are taken up in turn by the central processor via the Call Store Bus System as described in the above-named A. H. Doblmaier et al. application.

It has been known that digital messages are ideally suited for time division rather than space division switching due to their pulse format, providing inherently time-slotted information and thus greater freedom from cross-talk in the switch. Numerous other advantages of time-division switching for this purpose are detailed in D. B. James et al. Patent 2,957,949, granted Oct. 25, 1960. Such time division switching further provides additional opportunities for reducing the cost and complexity of an integrated analog-digital message switching center.

It is another object of this invention to reduce the per line digital message handling equipment of an integrated analog-digital message switching center by taking advantage of the message concentrating capability of the message switching facilities.

It is a more specific object of the invention to connect the digital message store and forward facilities to trunk appearances of a digital time-division switch rather than to provide store and forward capabilities on a per digital line basis.

Message store and forward facilities of the type herein contemplated necessarily involve large amounts of storage capacity and the ability to selectively access any part of such storage capacity. Such large stores and their associated access circuits are normally too complicated and interdependent to permit easy expansion of these facilities when demanded by increased traffic. In addition, a failure in any part of the storage or access circuitry normally renders the entire store and forward capability useless and, furthermore, places previously stored messages completely out of reach until repairs are completed.

It is a further object of the invention to divide the message store and forward capabilities of digital message switching facilities into a number of conveniently sized modules, all identical, independent in operation, and arranged to permit easy expansion of this capability merely by adding more of such modules.

It is a more specific object of the invention to provide a plurality of access paths to all stored digital messages so that failure of one portion of the access circuitry does not prevent retrieval of stored information.

In accordance with this aspect of the invention, intermediate capacity magnetic drum storage facilities and large capacity magnetic tape storage facilities, together with the access circuitry for both, are associated in modules sufficiently large to insure efficient handling of the data, and yet sufficiently small to give even the smallest switching center the advantages of their use. Access to each such drum or tape storage facility is had through multiple access switching equipment such that each of a plurality of identical access circuits can be connected to each storage facility, operate the same and retrieve all messages when a failure occurs in a companion access circuit.

All together, the above-described arrangements provide a truly integrated analog and digital message switching center capable of handling all of the many different types of message format used for modern communication.

These and other objects and features, the nature of the present invention and its various advantages, will be more readily understood upon consideration of the attached drawings and of the following detailed description of the drawings.

In the drawings:

FIGS. 1 and 2, when arranged as shown in FIG. 3, comprise a general schematic block diagram of an integrated analog and digital message switching center in accordance with the present invention;

FIGS. 4 and 5, when arranged as shown in FIG. 6, comprise a schematic block diagram illustrating the modular construction of the Store and Forward facilities of FIG. 2 in accordance with the present invention;

FIG. 7 is a detailed block diagram of a typical Input-Output Unit of the Message Store and Forward Module such as those shown in FIG. 2;

Figure 4:
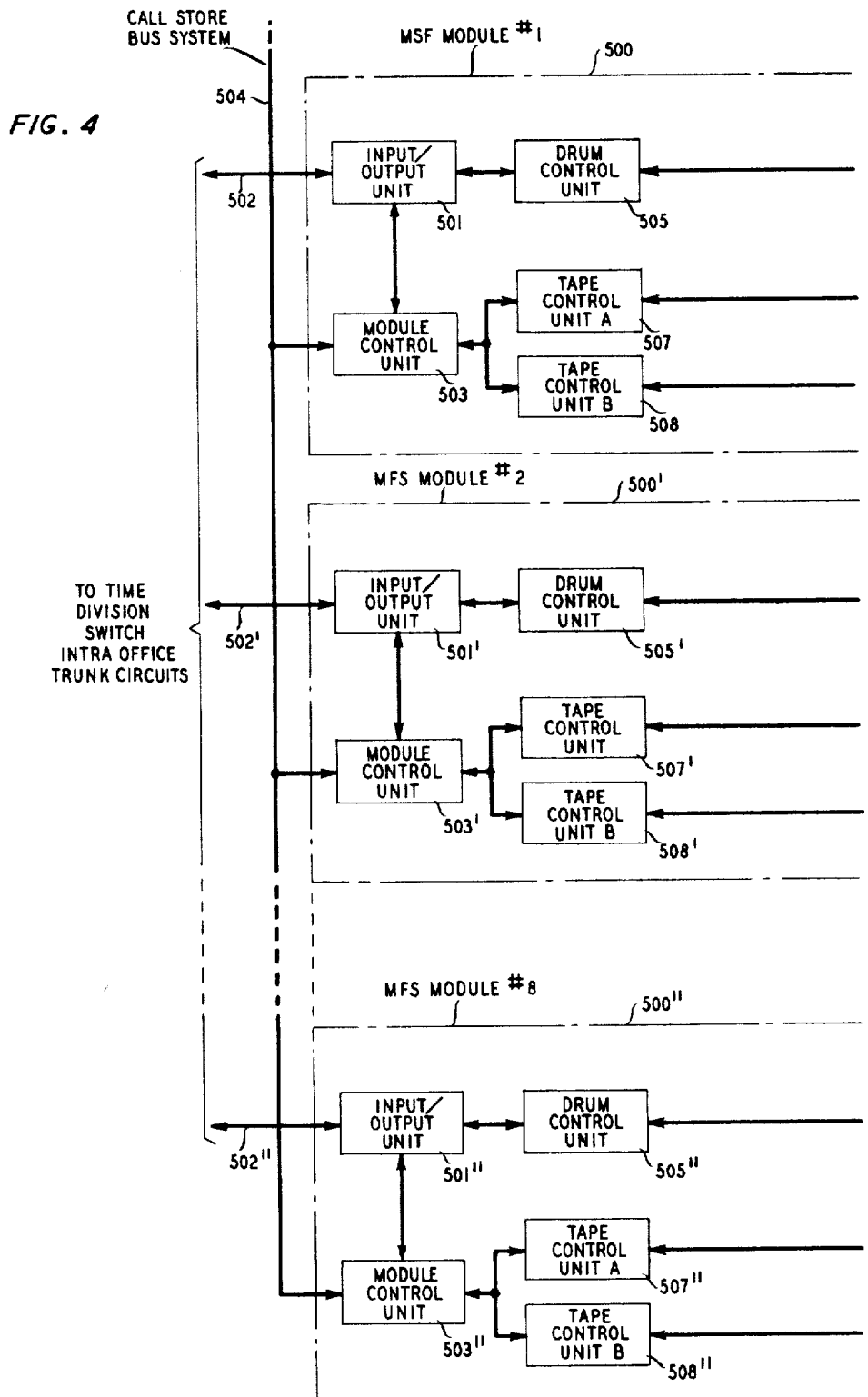

Referring more particularly to the drawings, FIGS. 1 and 2, when arranged as shown in FIG. 3, comprise a general block diagram of an integrated analog and digital switching center in accordance with the present invention. This switching center comprises four major systems including the Central Processor 100, the Space Division Switching Network 200, the Time Division Switching Network 300 and the Message Store and Forward Modules 400. Each of these four basic systems is represented schematically in FIGS. 1 and 2 in simplified form.

The central and most important system of the switching center of FIGS. 1 and 2 is the Central Processor 100. The Central Processor 100 is a centralized data processing facility which is employed to control the analog and digital connections, as well as implement maintenance, and administrative control of the switching center. The Central Processor 100 comprises three basic elements including the Central Control System 110, the Program Store System 140, and the Call Store System 170, together with the various interconnecting bus systems.

The Central Control System 110 comprises at least two fully independent central controls for the purpose of system reliability. The two independent central controls are duplicates, each arranged to perform all of the necessary functions for the entire system. The operation of the Central Control System 110 is divided into successive cycles of operation each of which is utilized to perform some elemental step necessary for the control of the switching center. These cycles of operation may, for example, comprise 5.5 microsecond instruction cycles corresponding to the access cycle intervals of Program Store System 140 and Call Store System 170. Submicrosecond clock pulses are provided to permit a series of subelemental operations within each 5.5 microsecond machine cycle.

The Central Control System 110 is provided with data inputs from the Program Store System 140 and the Call Store System 170, as well as from the Space Division Network 200, the Time Division Network 300, and the Store and Forward Modules 400. These inputs are utilized to report to the Central Processor 100 the contents and status of all the other systems of the switching center and thus provide the basic data upon which Central Control System 110 operates. The Central Control System 110 provides, as outputs, digital signals to all of the above systems to control their operation. Thus, it is seen that the switching center of FIGS. 1 and 2 is an electronic, common control switching system, the operation of which is divided into cycles of successive time slots each of which is utilized to perform, at the proper time, each elemental control operation.

The Program Store System 140 is a word-organized random access high capacity memory system. It comprises, for example, at least two independent program stores each of which comprises a plurality of modules of storage capacity and associated access circuitry. The Program Stores 141 may, for example, comprise permanent magnet, magnetic wire (Twistor) memories providing nondestructive readout of the information stored therein. Memories of this type are disclosed in the copending application of C. F. Ault et al., Ser. No. 311,424, filed Sept. 25, 1963, since matured into U.S. Patent 3,295,-111, granted Dec. 27, 1966, and assigned to applicants' assignee. Each of twelve such memory modules has a capacity of 8,192 forty-four bit words. The Program Store System 140, being semipermanent in nature, is employed to store the least volatile system information, and the information requiring greatest protection against errors, such as the system program, translation information, and class of service. Information may be written into the Program Store 141 by means of the Card Writer 142.

The Call Store System 170 is also a word-organized random access high capacity memory system. The Call Store System 170 likewise comprises at least two independent call stores for reliability. The call store may, for example, comprise ferrite sheet memories of the type disclosed in the copending application of P. A. Harding, Ser. No. 246,505, filed Dec. 21, 1962, since matured into U.S. Patent 3,299,278, granted Jan. 17, 1967. Such a store has the capacity of 8,192 twenty-four bit words. Since this type of memory involves destructive readout, data may be easily placed in the Call Store System 170 and hence this memory is used for the more volatile information required for the operation of the switching center. Such information includes recent directory changes, intermediate instructions, current status of the system, et cetera.

The subsystems of the Central Processor 100 are interconnected by a system of buses and cables. Each bus system comprises a plurality of pairs of conductors each pair of which is used to transfer one bit of binary information between the various systems. Data or command words are transmitted on the bus system in parallel, each bit on one pair of conductors of the bus. In addition, each bus is normally duplicated to increase reliability.

The Space Division Switching Network 200 serves to selectively interconnect, through metallic paths, subscribers' lines and trunks as well as the various ancillary signalling receivers and transmitters, registers, and supervisory tone sources. Such networks and the control thereof are described more fully in the copending applications of A. Feiner, Ser. No. 253,083, filed Jan. 22, 1963, since matured into U.S. Patent 3,257,513, granted June 21, 1966, K. S. Dunlap et al., Ser. No. 295,458, filed July 16, 1963, since matured into U.S. Patent 3,281,539, granted Oct. 25, 1966, and T. N. Lowry, Ser. No. 205,920, filed June 28, 1962, since matured into U.S. Patent 3,231,679, granted Jan. 25, 1966. In accordance with these copending applications, the Space Division Network 200 provides not only the connection paths between lines and trunks, but also the means for establishing such paths and supervising their operation. The Central Processor 100 maintains a record of the busy and idle states of all paths through the network and uses this information when setting up new paths through the network.

The Central Processor 100 and Space Division Network 200, as described above, comprises the subject matter of the aforementioned A. H. Doblmaier et al., application Ser. No. 334,875, filed Dec. 31, 1963. A brief description of the operation of the Space Division Network 200 in conjunction with the Central Processor 100 is, however, in order. For convenience the progress of a typical call through the switching center will be described, together with some of the measures that the Central Processor 100 must take to insure proper system operation.

Assume, as a starting point, that the Data Processing Circuit 111 in Central Control System 110 provides, as an output to Program Address Register 112, an address for the next program order word for the operation of the system. This address is transferred via Program Store Address Bus 190 to the Program Address Register 143 in Program Store System 140. This address is decoded in Program Address Decoder 144 and used to interrogate a specific order word location in Program Store 141. The order word therein located is read out of Program Store 141 by means of read-out circuit 145 and transferred, by way of Program Store Response Bus 191, to Order Word Registers 113 in Central Control System 110.

It will be assumed that the order word thus obtained from the Program Store System 140 includes instructions which command the scanning of analog subscriber lines. Data Processing Circuit 111 recognizes this portion of the instructions and provides an appropriate input to Network Command Translators 114. Network Command Translators 114, in turn, generate a scanning command which is applied via Network Command Bus 450, to Line Scan Network 201 in the Space Division Switch 200. Line Scan Network 201, in response to this command, ascertains the supervisory state of a group of analog subscriber lines such as lines 451, connected to Analog Subscriber Stations 463. The identity of these subscriber lines is included in the scanning command to Line Scan Network 201.

The individual supervisory states of the group of subscriber lines thus scanned is transmitted back to Logic Register 115 in Central Control System 110 by way of Scanner Bus 452. It will be appreciated, of course, that subsequent commands from Central Control System 110 are transmitted to Line Scan Network 201 to determine the supervisory states of other groups of analog subscriber lines.

Following the interrogation of the subscriber lines, Data Processing Circuit 111 in Central Control System 110 provides outputs to Index Adder Output Registers 116 which comprise an address in Call Store System 170. This address is transmitted by way of Call Store Address Bus 453 to Call Store Address Register 171 in Call Store System 170. This address is decoded by Call Store Address Decoder 172 to interrogate a specific word location in the Call Store 173. The contents of this word location are read out of Call Store 173, by way of read-out circuits 174, to Data Register 175. This word, in turn, is transmitted, by way of Call Store Response Bus 454, to Data Buffer Register 117. The information thus read out of Call Store 173 represents the previous supervisory states of the group of analog subscriber lines now being scanned, i.e., the results of the previous scan operation. Since this read-out is destructive, the supervisory state word is also immediately read back into Call Store 173 by way of Read-in Circuits 176.

The Data Processing Circuit 111 of Central Control System 110 compares the present supervisory states of the individual analog subscriber lines with their previous supervisory states as reported by Call Store System 170. Any change from the on-hook supervisory state to the off-hook supervisory state is interpreted as a request for service. The new supervisory states, of course, are recorded in Call Store System 170 by way of Call Store Write Data Bus 455, Data Register 175 and Read-in Circuits 176. Thus Call Store 173 always contains a record of the supervisory state of each analog subscriber line at an address which is discrete to the particular subscriber line. This record is maintained current at all times. In this connection, it should be noted that the lines and trunks are each scanned approximately once every one-tenth of a second in order to detect requests for service.

Having detected an initial change of the subscriber lines from on-hook to off-hook, the Central Control System 110 takes steps to provide a connection through the Switching Network 200 between the requesting subscriber line and an appropriate call signaling receiver, i.e., a dial pulse receiver or a TOUCH-TONE receiver, as required. The Central Control System 110 determines the type of call signaling receiver required by examining the class of service mark assigned to the requesting subscriber station and recorded in Program Store System 140 or, in the case of recent changes, recorded in the Call Store System 170.

Having determined the type of call signal receiver required, the Central Control System 110 examines the availability of idle receivers of that type as well as the availability of idle connection paths between the requesting subscriber and the idle reeciver. Both of these availabilities are determined by examining appropriate address locations in the Call Store System 170 where such information is recorded. When both an idle path and an idle receiver have been discovered, Network Command Translator 114 issues a command, via Network Command Bus 450, to Network Controller 204 to establish the proper connection through Line Link Network 202 and Trunk Link Network 203. At the same time, this receiver and this path are marked as "busy" in the appropriate location in Call Store 173.

The call signaling receiver associated with an appropriate one of the Trunk Circuits 205 detects the call signals and transmits them by way of Trunk Scan Network 206 and Scanner Answer Bus 452 to Logic Register 115. The call signaling receiver, of course, also provides dial tone to the subscriber connected thereto until the first digit of the called number is received.

The Data Processing Circuits 111 in Central Control System 110 record the called number in an originating register which, in actuality, comprises a plurality of storage locations in the Call Store 173. Following the register of the called number, and in response to program instructions from the Program Store System 140, Central Control System 110 examines the registered call number in order to determine the destination of the call. Central Control System 110 then interrogates the Call Store System 170 to determine the availability of the called destination apparatus and the availability of connection paths to this apparatus. When found, this apparatus and this path are marked as "busy" in the Call Store 173 and steps are taken to establish the required connection.

If the connection is to be made to a service code number, the connection is directly established between the calling subscriber and the destination apparatus by way of Network Command Translator 114, Network Command Bus 450, Network Controller 204, Line Link Network 202 and Trunk Link Network 203.

If the call is an intraoffice call, or if the call requires an outgoing trunk, the connection is accomplished in two steps. In an intraoffice call, for example, a connection is established between a calling subscriber and a source of ringing induction and between the called subscriber and a source of ringing current. When the called subscriber answers, the through connection is established between the calling subscriber and the called subscriber. Likewise, on interoffice calls, when an outgoing trunk is required, a connection is first established between the appropriate trunk and a call signal transmitter, either dial pulse or multifrequency. The call signaling information can then be forwarded over the trunk 464 to the distant office by way of analog Transmission Facility 465. After the call signaling has been completed, this connection is broken down and a connection is made between the calling subscriber and the selected trunk. In this case, ringing induction and ringing current are supplied either from the trunk circuit itself or from the distant office.

The above description refers only to analog subscriber calls and only to the barest work functions required to establish the connection. The Central Processor 100 also provides for various subroutines in unusual circumstances and likewise includes maintenance and trouble detecting routines for diagnostic tests, remedial actions and preventive maintenance. As previously noted, each of the major elements of the system is duplicated either completely or partially. In addition, the most reliable components available are used. The system is therefore, able to continue to operate even in the presence of errors and faults. This philosophy extends even to the bus systems which are duplicated and which provide redunant paths between all of the major components. A more detailed description of the contents of the Central Processor 100 and the Space Divider Switch 200 form the subject matter of the above-described A. H. Doblmaier et al. application. This application may therefore be referred to for a more detailed treatment of the implementation of the above-described operations.

As noted in the above-described A. H. Doblmaier et al. application, the Central Processor 100 is arranged to co-operate with a large plurality of Call Stores similar to Call Store 170. In general, Central Control System 110 provides address information to each Call Store to identify the particular Call Store required and a word address in that particular Call Store. In conjunction with such addresses, the Central Control System 110 also provides, on Call Store Write Data Bus 455, information to be placed in that word location of the Call Store. Alternatively, Central Control System 110 is prepared to receive the information stored in that word location in Call Store 170 by way of Call Store Response Bus 454. In addition, Central Control System 110 receives further supervisory information from peripheral units by way of Master Scanner 466 and Logic Register 115.

In accordance with the present invention, digital message handling capacity is provided in the switching center of FIGS. 1 and 2 with no modifications of the Central Processor 100 other than the insertion of appropriate programs and instructions in Program Store 141. This is accomplished by connecting the digital message handling equipment to the Call Store Bus System, including Call Store Address Bus 453, Call Store Response Bus 454, and Call Store Write Data Bus 455. This digital message handling equipment, including Time Division Switch 300 and Message Store and Forward Modules 400, is treated by Central Processor 100 in exactly the same manner as the Call Store System 170. That is, appropriate address and instruction information is placed on Call Store Address Bus 453 and addressed to the appropriate one of the digital message handling equipments. Data is transferred from the Central Processor 100 to the digital message equipment by way of Call Store Write Data Bus 455 and data is transferred to Central Processor 100 by way of Call Store Response Bus 454. The nature of the address and data information, of course, is rendered appropriate for the functions intended by means of data processing circuits 111 under the control of appropriate order words from the Program Store System 140.

The Time Division Switch 300, for example, includes a Buffer Register 301 which is connected to the Call Store Address Bus 453. Call Store Address Bus 453 is also connected to the Signal Assembler-Distributors 302 and 303 in Time Division Switch 300. The digital subscriber lines, such as line 456, connected to Digital Subscriber Station 460 and digital transmission lines, such as line 457, connected to Digital Transmission Facilities 461, are connected to digital terminal circuits such as Terminal Circuits 304 and 305. In general, the Terminal Circuits 304 and 305 serve to retime all connected digital signals to a master clock rate in preparation for the time division switching operation. Supervision for the digital messages is interleaved in the message bit stream at regular intervals. Signal Assemblers-Distributors 302 and 303 strip the supervisory signal bits from the message stream, assemble them into uniform-sized blocks, and transmits them to Central Processor 100 by way of Call Store Response Bus 454. Signal Assembler-Distributors 302 and 303 also, and conversely, accept coded supervisory characters from Central Processor 100 and insert them in appropriate positions in each outgoing message bit stream.

In general, the Time Division Switch 300 includes a plurality of terminal circuits, such as Terminal Circuits 304 and 305, which may be selectively interconnected by way of a plurality of multiplex buses in which data bits from the various terminal circuits are interleaved in time in regularly recurring cycles. That is, the originating terminal circuit and the destination terminal circuit are connected to the common bus for a very brief interval, but this connection is repeated at regularly recurring intervals to provide a complete digital interconnection in which no information is lost. These interconnections take place in Time Division Link Matrix 306 and are controlled by the information in Link Memory Units 307.

In general, Time Division Switch 300 works in conjunction with the Central Processor 100 in the following manner. A digital message arriving on a digital line such as line 456 is preceded by a request for service signal in the form of a unique code in the supervisory bit positions. These bits are separated by the Terminal Circuits 305 from the message stream and transmitted to Signal Assembler-Distributor 303. From here, requests for service are transferred, via Call Store Response Bus 454, to the Data Buffer Register 117 in Central Control System 110. The Central Processor 100 is thereby alerted to prepare for the imminent arrival of a digital message at the switching center. Digitally coded addressee information is then transmitted from the calling subscriber to the switching center where it is assembled in Signal Assembler-Distributor 303 and transmitted to the Central Processor 100.

At this point, the digital message control is handled much like the analog message control heretofore described. That is, idle destination apparatus and idle communication paths are secured through the Time Division Swith 300. Availability of this destination apparatus and the communication paths thereto are ascertained, as before, by referring to a portion of the call store system 170 in which this information has been recorded. These paths through Time Division Switch 300, however, are available time slots in recurring cycles of time slots. Rather than setting up the connection by way of Network Command Translators 114, Network Command Bus 450, and Space Division Switch 200, however, the Central Control System 110 instead provides appropriate digital information on Call Store Address Bus 453 to Buffer Register 301. This information includes the identity of the calling and called Terminal Units, the appropriate time division gates to be operated, and the time slot in each cycle in which these gates are to be operated. This information is stored in the Link Memory Units 307 and utilized to operate the appropriate gates at the appropriate times. It will be noted that trunk appearances on Space Division Switch 200 and Time Division Switch 300 can be interconnected by Analog-Digital Converters 462. Analog-Digital Converters 462 are arranged to convert pulse coded analog signals back to analog signals, and vice versa.

In many cases, digital messages will be received at the switching center of FIGS. 1 and 2 when the destination apparatus is not immediately available. Rather than requiring the calling subscriber to await the availability of such destination apparatus, the switching center of FIGS 1 and 2 automatically provides message store and forward capacity to which such messages are directed for storage and later transmittal to the called subscriber. Thus Message Store and Forward Modules 400 are connected to Time Division Switch 300 by way of selected ones of the Terminal Circuits 305. Each Message Store and Forward Module, in general, comprises a Data Input-Output Unit 401, which operates as a data buffer to assemble the serial data stream into uniformly-sized characters and to transmit these characters in parallel to the Module Control Unit 402.

Module Control Unit 402 includes an assembler storage facility of sufficient size to store a plurality of message characters from a calling subscriber. Such a message is, for handling convenience, divided into arbitrarily sized message blocks. Each block, when assembled in the assembler storage facility is then transferred, as a block, either to the Drum Unit 403, by way of Drum Control Unit 405 and Drum Switch 406, or to a Tape Unit 404, by way of Tape Control Unit 407 and Tape Switch 408.

In general, the Drum Unit 403 provides intermediate storage capacity for intermediate-sized messages. The Tape Unit 404, on the other hand, provides large storage capacity for the storage of extremely large messages such as facsimile. In addition, Tape Unit 404 can be used as an overflow store in the event that the Drum Unit 403 reaches a point of being nearly full. In addition, the Tape Unit 404 may serve to provide a permanent record of all messages received and transmitted by the switching center of FIGS. 1 and 2. The operation of the Message Store and Forward Modules 400 will become more apparent hereinafter when this operation is taken up in more detail.

Figure 5:
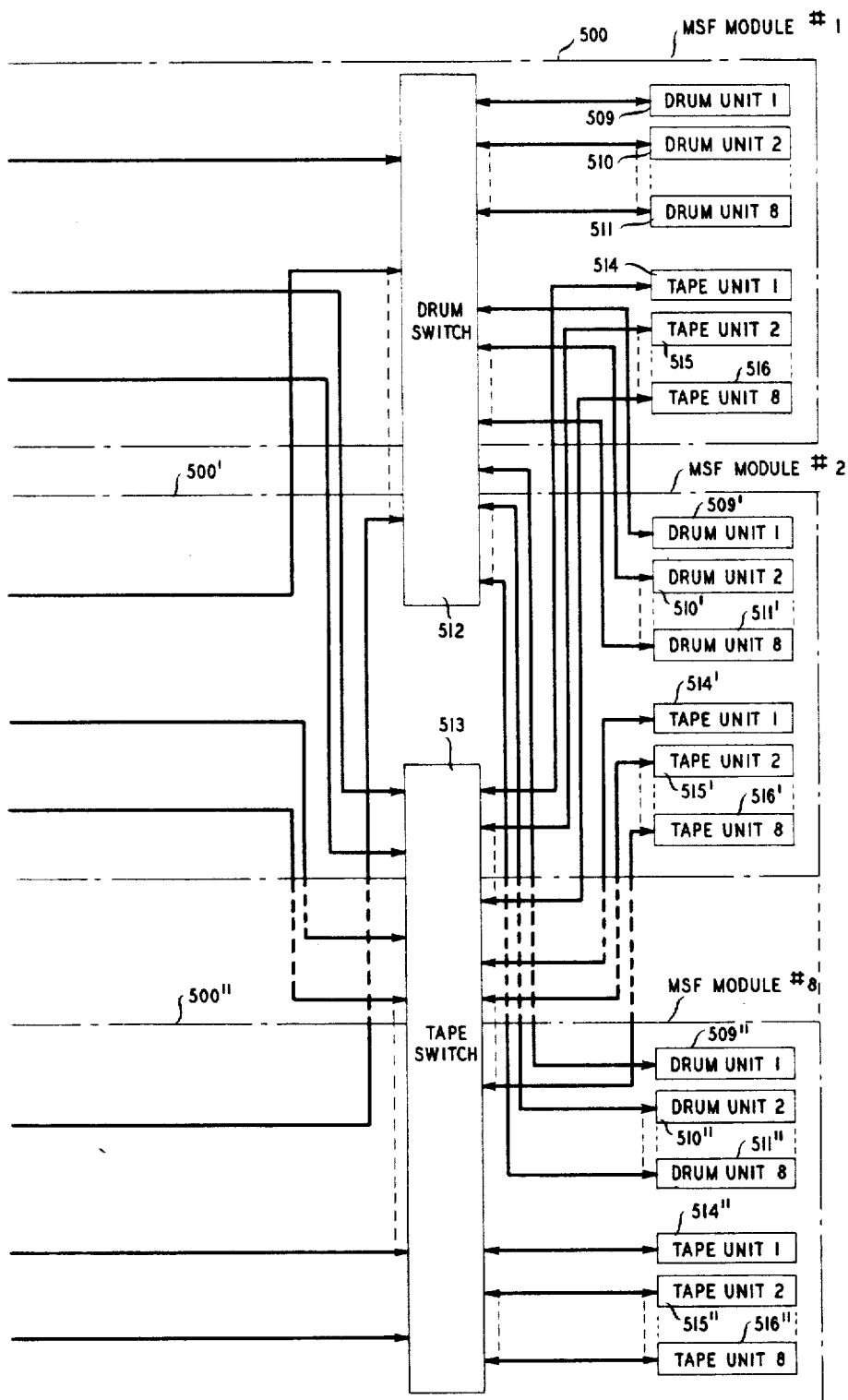

Referring to FIGS. 4 and 5 of the drawing, when arranged as shown in FIG. 6, they show a block diagram of the modular arrangement of the message store and forward facilities, shown in simplified form in FIG. 2. Thus, the message store and forward facilities comprise a plurality of identical Modules 500, 500', ... 500'', each being independently controlled by the Central Processor 100 of FIGS. 1 and 2 and each capable of receiving and storing digital messages received at the Time Division Switch 300. Since these modules are identical, only one module, Module 500, will be described in detail, the rest of the modules, of which there may be up to seven, may be assumed to be identical, being distinguished only by the Terminal Circuits 305 (FIG. 2) to which they are connected.

Module 500 comprises an Input-Output Unit 501 to which there is connected a plurality of digital message trunks 502 from the Time Division Switch 300. The Input-Output Unit 501 provides speed buffering and serial-to-parallel translation of the message streams appearing on trunks 502. This unit also contains scanning and addressing circuits for selectively enabling the desired ones of a plurality of individual trunk terminating units. Each of a plurality of digital message trunks may therefore be selectively and simultaneously, on an interleaved time slot arrangement, serviced by the Module 500.

Message Store and Forward Module 500 also includes a Module Control Unit 503, which includes all of the control circuits to control the balance of the module, as well as an assembler store to be used for assembling received messages into uniformly-sized blocks. The Module Control Unit 503 is connected to the Call Store Bus System 504 including, as can be seen in FIG. 2, Call Store Address Bus 453, Call Store Response Bus 454 and Call Store Write Data Bus 455. In general, under the control of instructions from the Call Store Bus System 504, Module Control Unit 503 enables input units connected to message trunks over which digital messages are arriving, receives words from the input unit, and stores them in the assembler store unit a message block has been completely filled. At that time, the Module Control Unit 503 alerts the Central Control System 110 of FIG. 3 that a message block has been completely assembled for a particular trunk 502. The Central Control System 110 examines information defining the type of message and thus determines whether the message block is to be transferred to a drum unit or a tape unit. If the message block is to be transferred to a drum unit, the Central Control System 110 examines the availability of idle drum unit storage locations, stored in appropriate address locations in the Call Store System 170, and chooses an idle storage location. The Central Control System 110 sends an instruction, via the Call Store Bus System 504, to the Module Control Unit 503 which initiates the transfer of the assembled message block to the desired drum unit storage location. There are two Tape Control Units 507 and 508 to provide the required traffic handling capability. Moreover, message blocks from two different tape units may be handled simultaneously, one by way of each control unit.

The Drum Control Unit 505 prepares the message blocks for recording on a conventional magnetic drum as will be described in detail hereinafter. Each of these Drum Units 509, 510 ... 511 includes a plurality of peripheral tracks upon which digital data may be stored by selectively reversing the state of remnant magnetization of elemental portions of the drum surface. These tracks are grouped into bands of three tracks each upon which message blocks are assembled. A Drum Switch 512 is provided to selectively interconnect the Drum Control Unit 505 with any one of the Drum Units 509 through 511. As can be seen from the drawings of FIGS. 4 and 5, Drum Switch 512 may also be used to selectively connect the drum control unit from any of the Message Store and Forward Module 500, 500' ... 500'' to any one of the Drum Units 509 through 511, 509' through 511' or 509'' through 511''. In this way, the failure of any control unit or of any Message Store and Forward Module does not prevent the retrieval of messages stored in the associated drum units.

There is also provided a Tape Switch 513 which can be used to selectively interconnect any one of the Tape Control Units in Message Store and Forward Modules 500 through 500'' to any one of the Tape Units 514 through 516, 514' through 516' or 514'' through 516''.

As can be seen in FIGS. 4 and 5, there are up to eight drum units in each Message Store and Forward Module. As will be seen hereinafter, each drum unit has a capacity for storing 392,216 bits, divided into 16,384 twenty-four bit words, which, in turn, are divided into 256 sixty-four word blocks. The actual number of drum units provided will depend upon the digital traffic arriving at the particular switching center.

As can also be seen in FIGS. 4 and 5, there are eight tape units provided for each Message Store and Forward Module. One tape unit may be reserved for the storage of facsimile messages. Such messages are usually long in comparison to other forms of digital messages and require excess storage capacity if stored in the drum system. Tape units may also be reserved for drum overflow when the drum units of that message store and forward module become nearly filled and the danger of message loss might arise. A third tape unit is reserved to keep a permanent record of all messages received at that particular Message Store and Forward module. This can be accomplished by transferring each message to the record tape following its transmission from the switching center. The remaining tape units may be reserved for any other purpose required, but at least one should be reserved for standby operation in the event that one of the other tape units fails.

Referring now to FIG. 7, there is shown in more detail a block diagram of an Input-Output Unit suitable for any one of the Message Store and Forward Modules of FIGS. 4 and 5. Input-Output Unit 401 in FIG. 7 includes a High Speed Input Line Unit 601, a High Speed Output Line Unit 602, a plurality of Low Speed Input Line Units 603, 604 ... 605 and a plurality of Low Speed Output Line Units 606, 607 ... 608. The High Speed Lines 609 are capable of receiving and transmitting data at a rate up to 40.8 kilobits per second while low speed digital lines 610, 611 ... 612 are each capable of receiving and transmitting digital data at a rate up to 2.4 kilobits per second.

Each message bit stream arriving at or departing from Input-Output Unit 401 is associated with a clock signal from a central source of timing which is applied to the corresponding input and output line units. For this reason, Input-Output Line Units are not restricted to any particular message rates within their range. The low speed line units, for example, are capable of receiving digital messages at the teletypewriter rate of 100 words per minute.

Input Line Unit Scanner 613 is arranged to scan all of the input line units of Input-Output Unit 401. Each of the input line units is arranged to receive input data messages in the form of a serial bit stream and assemble them into uniformly-sized characters. When such characters have been assembled in the input line units, Input Line Scanner 613 produces a request for transfer code identifying that input line unit and transfers it to Address Bus 614. This information is to be used to instruct the module control unit, to be hereinafter described, to accept the assembled character.

Similarly, on outgoing messages, the output line units receive uniformly-sized characters from the Data Bus 615 and transmit them as a serial pulse train on the output line, under the control of the external clock signal. An Output Line Unit Scanner 616 is provided to detect when a character has been transmitted from the output line unit. This information, in the form of a digital code, is likewise transferred to Address Bus 614. This information is used to transfer a new character to the output line unit.

Also included in Input-Output Unit 401 is a Line Unit Address Register 617 connected to Address Bus 614. Line unit addresses are registered in Line Unit Address Register 617 and are applied to Line Unit Address Decoder 618. The output of Decoder 618 is used to selectively enable each of the line units to be used. All of the information on Address Bus 614 is in parallel coded form. Signals on Control Cable 619 gate the parallel codes from the appropriate source to the appropriate destination.

The output message data on Data Bus 615 is obtained from the Assembler Store. Message Data from the input units is transferred to the Assembler Store in the Module Control Unit, as will be hereinafter described.

Figure 8:
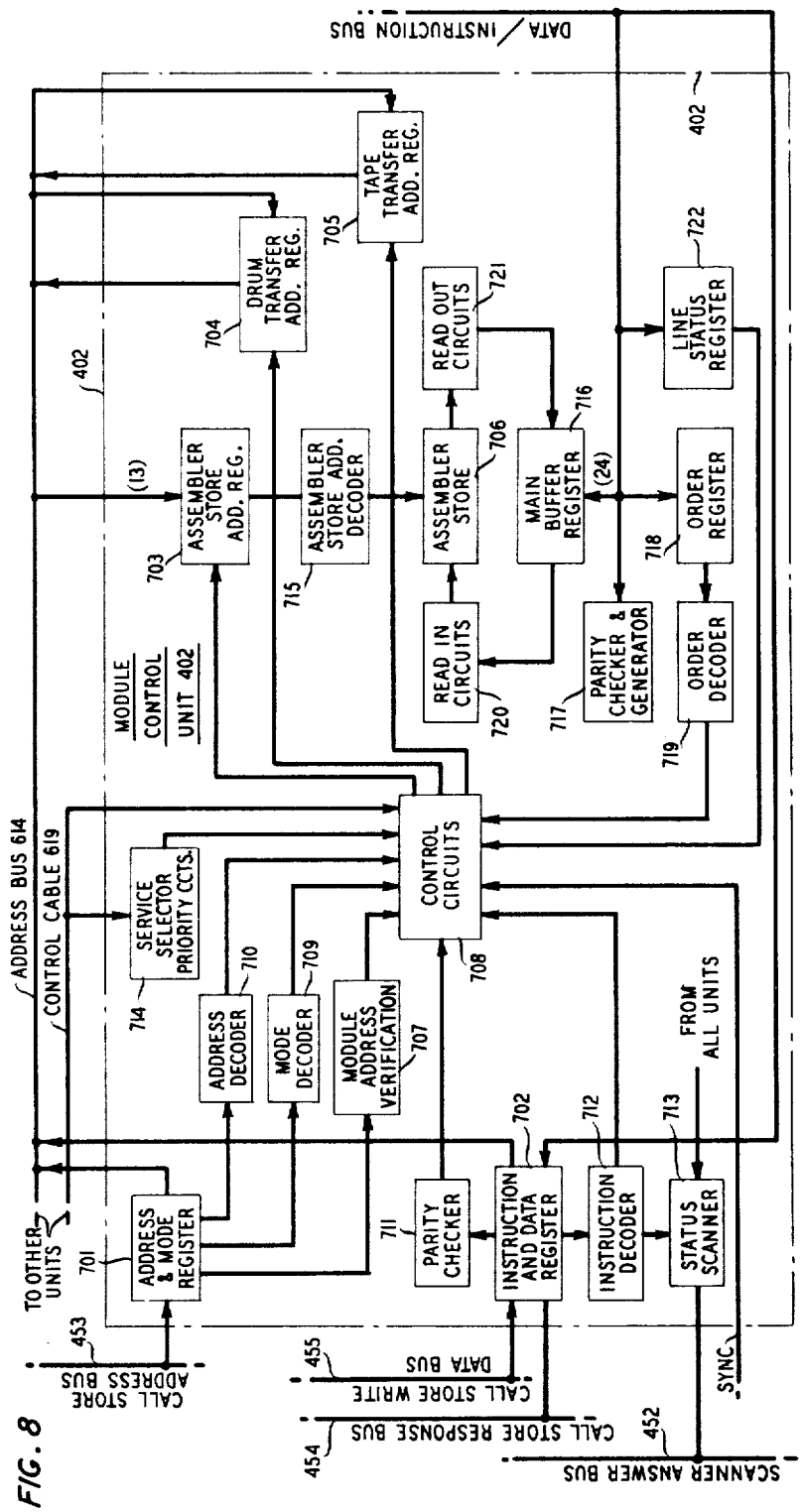
FIG. 8 is a detailed block diagram of a typical Module Control Unit of a Message Store and Forward Module as shown in FIG. 2.

Referring then to FIG. 8, there is shown a more detailed block diagram of the Module Control Unit 402 shown in FIG. 2. Module Control Unit 402, as can be seen in FIG. 8, comprises a plurality of registers including Address and Mode Register 701, Instruction and Data Register 702, Assembler Store Address Register 703, Drum Address Register 704, Tape Address Register 705, together with an Assembler Storage apparatus 706. The Assembler Store 706 is similar to, and may be identical with, the Call Store 173 in FIG. 2. That is, Assembler Store 706 is a word-organized random access high capacity memory. It comprises ferrite sheet memories of the type disclosed in the aforementioned patent of P. A. Harding. Such a store has a capacity of 8,192 twenty-four bit words together with associated Read-in Circuit 720 and Read-out Circuit 721.

The word locations in Assembler Store 706 are divided into blocks of sixty-four words to which independent and discrete uses are assigned for the proper operation of the system. Thus, for example, four blocks are assigned to each of the digital message lines 609, 610, 611 . . . 612 shown in FIG. 7. Two of these four blocks are used for receiving characters assembled in the input line units of FIG. 7. That is, characters are assembled in one of the blocks until the complete block is filled. Thereafter, transfer to the drum or tape units is accomplished from this block while the second block is being filled by characters from the input line units, and so forth.

Similarly, the two blocks assigned for transmitting data to each digital line are used sequentially, one block being loaded with data from a drum or tape unit while the other block is being emptied, a character at a time, by the output line units of FIG. 7. Since one high speed digital message line 609 and up to twenty-four low speed digital lines 610 through 612 are provided, a total of 100 message blocks in Assembler Store 706 are reserved for message data assemblage and distribution.

Another sixteen blocks in Assembler Store 706 are reserved for buffering data transfers to the tap units. Another block is reserved for the storage of status words, a block is reserved for queuing instruction words, and twelve blocks are reserved as spares. The mechanism of transfers to and from the drum and tape units will be hereinafter described.

Instructions from the Central Processor 100 normally arrive on Call Store Write Data Bus 455 and are stored in Instruction and Data Register 702. Such instructions may comprise, for example, instructions to accept data on particular message data input lines or to transfer data to such lines, to transfer data from a drum unit to a tape unit, or to write particular data or instruction words into particular register or store locations with the Message Store and Forward Module.

Normally, such instructions will be accompanied by a coded address on Call Store Address Bus 453 to be registered in Address and Mode Register 701. Such address information includes the address of the module which is verified in Module Address Verification Circuit 707 and used to enable the correct module by means of Control Circuits 708. Such address information may also include the address of a particular storage location, which address is decoded in Address Decoder 710 and transferred to Control Circuits 708. In addition, such address information may include mode information which is decoded in Mode Decoder 709 and used in Control Circuits 708 to determine the type of transfer involved. Transfers from drums to tapes, for example, may take place with large message blocks than required for transfers into and out of the Message Store and Forward Module. Finally, the address of particular line units of FIG. 7 may be transferred directly to Address Bus 614 for use in Line Unit Address Register 617.

All instructions received in Instruction and Data Register 702 include a parity check bit for detecting errors in the instructions. The parity of each instruction word is checked in Parity Checker 711 and reported to Control Circuits 708. Instruction words arriving at Instruction and Data Register 702 are decoded in Instruction Decoder 712 and used by Control Circuits 708 to initiate the appropriate action. Data words received by Instruction and Data Register 702 may be transferred directly to Address Bus 614 when required.

In order to keep the Central Processor 100 aware of the current status of all of the units of each Message Store and Forward Module, the status of these units is maintained current in Assembler Store 706 and reported by a Status Scan Circuit 713 which may be addressed at regular intervals by instructions from Decoder 712. This status information is returned to the Central Processor 100 by way of Scanner Answer Bus 452.

The Module Control Unit 402 of FIG. 8 controls the operation of the Message Store and Forward Module in response to requests for service from the various other units. These requests for service are applied to a Service Selector 714 which queues the requests in the order of their receipt or, in some cases, in accordance with assigned priorities, and thereby allow Control Circuits 708 to take up each request in turn.

Assembler store addresses received by Assembler Store Address Register 703 are decoded in Assembler Store Address Decoder 715 and used to address appropriate word locations in Assembler Store 706. A word in that location may be read out by way of Read-out Circuit 721 to Main Buffer Register 716, or a word in Main Buffer Register 716 may be written into that word location by way of Read-in Circuit 720. Each word transferred to Main Buffer Register 716 includes a parity bit for error detection and is checked by Parity Checker and Generator 717. The word in Main Buffer Register 716 may be transferred to Data Instruction Bus 615 or to an Order Register 718. Order words stored in Order Register 718 are decoded by Order Decoder 719 and used by Control Circuits 708 to control transfers to, from or within the module.

When a drum transfer is taking place to or from a Drum Unit, the address of the first word in a message block is written into Drum Address Register 704. The word at this address in Assembler Store 706 may then be transferred to an appropriate address in one of the drum units. Conversely, the word stored in one of the drum units may be transferred to that address in the Assembler Store 706. Following the transfer of this word, Drum Transfer Address Register 704 is advanced, by way of addresses on Address Bus 614, by one to provide the address of the next succeeding word location, thus providing the address of the second word of the message block. This word is then transferred and Drum Address Register 704 again advances. Drum Address Register 704, is in this way, advanced through the entire message block, one word at a time, and used to control the transfer of words to and from Assembler Store 706 at these addresses. The Tape Address Register 705 is used in a corresponding manner to control the transfer of data between word addresses in Assembler Store 706 and word addresses in one of the tape units.

From the above description, it can be seen that the Module Control Unit 402, after receiving instructions from the Central Processor 100, is capable of accepting, transferring, or transmitting an entire message block without further intervention of the Central Processor 100. This relieves the Central Processor 100 of a great deal of routine control operations and thus provides for a more efficient use of the Central Processor machine cycle time. In this respect, the Assembler Store 706 temporarily operates as a program store into which detailed instructions are written for the control of the Message Store and Forward Module. Thereafter, the module is self-controlled until the completion of that message transfer. A new transfer cycle may then be initiated by the transfer of an appropriate instruction from Central Processor 100 via Call Store Write Data Bus 455 to Instruction and Data register 702.

Figure 9:
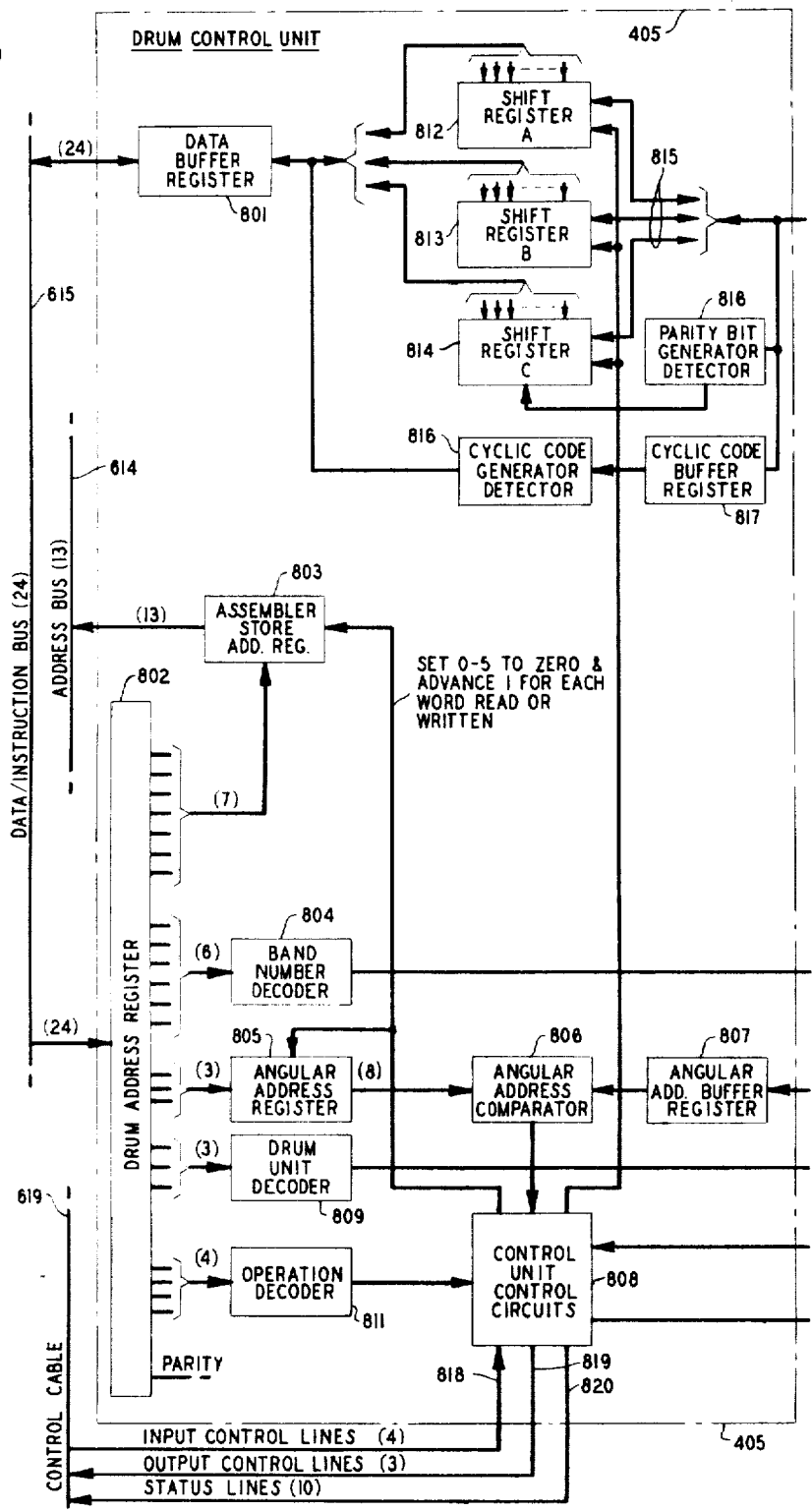
FIG. 9 is a detailed block diagram of a typical Drum Control Unit of a Message Store and Forward Module as shown in FIG. 2.

In FIG. 9 there is shown a typical drum control unit which may be used for Drum Control Unit 405 in FIG. 2. The drum control unit of FIG. 9 includes two registers, Data Buffer Register 801, and Drum Address Register 802. Data Buffer Register 801 and Drum Address Register 802 are connected to Data Instruction Bus 615 which, as can be seen in FIG. 8, is connected to the output of the Assembler Store 706. In addition, an Assembler Store Address Register 803 is connected to Address Bus 614.

Instructions for the operation of the Drum Control Unit 405 of FIG. 9 are supplied from the Assembler Store 706 via Data Instruction Bus 615 to Drum Address Register 802. These instructions each comprise a twenty-four bit word which is divided into portions as will be described below. The first seven bits, for example, contain the first seven digits of a thirteen digit word-address in the Assembler Store 706. This address is the address of the first word of a message block and hence may be considered the message block address. Assembler Store Address Register 803 is a thirteen bit register and records the seven bit message block address in the seven most significant digit positions, filling the balance of the register with zeros. During a transfer operation, after each word is transferred the number stored in Assembler Store Address Register 803 is advanced by one, thus providing the address of the next succeeding word of the message block. These addresses are transferred via Address Bus 614 to Drum Transfer Address Register 704 in FIG. 8. These addresses are used to address Assembler Store 706 in the proper word location when the next word transfer takes place.

The next six bits in the Drum Address Register 802 comprise a band number address of the associated drum unit. As will be hereinafter described, each drum has 192 parallel, peripheral tracks divided into 64 bands of three tracks each. Band Number Decoder 804 decodes the six digits of the band number address and utilizes the information to control access to the drum by selectively enabling only the addressed band.

Since each track of the drum includes 4,096 angular bit positions, each band may be divided into 512 twenty-four bit words thus providing eight sixty-four word message blocks per band. These eight message blocks may be selectively addressed by the next three bits in Drum Address Register 802. These bits are therefore stored in Angular Address Register 805 and compared in Angular Address Comparator 806 with angular addresses stored in Angular Address Buffer Register 807. The addresses in Register 807 are derived from a separate angular address track on the drum, and hence represent the angular position of the drum at that instant. When Comparator 806 indicates that the angular addresses in Registers 805 and 807 are identical, a control signal is transferred to Control Circuits 808 to signal the beginning of a transfer operation.

As noted in connection with FIG. 5, each Message Store and Forward Module includes up to eight drum units. Hence the next three digits in Drum Address Register 802 represent the drum unit address and are supplied to Drum Unit Decoder 809. The output of Decoder 809 is, in turn, used to connect the Drum Control Unit 405 of FIG. 9 to the appropriate one of the eight available drum units. This is accomplished by means of a Drum Switch 512, seen in FIG. 5.

The next four bits in Drum Address Register 802 identify the particular operation which is to take place with respect to the identified drum unit. These operations include:

(1) Transfer-in a 63 word block;
(2) Transfer-out a 63 word block;
(3) Transfer-in a 64 word block;
(4) Transfer-out a 64 word block;
(5) Transfer-in a 256 word block; and
(6) Transfer-out a 256 word block.

These various operations are decoded in Operation Decoder 811 and applied to Control Circuits 808 to initiate the appropriate operation.

The last bit in Drum Address Register 803 is a parity bit and may be used for a conventional parity check.

Following each twenty-four bit code registered in Drum Address Register 802, there are a series of twenty-four bit message words which are stored in Data Buffer Register 801. Since the data must be recorded in serial form on three tracks of a band on the drum unit, the twenty-four bit word in Data Buffer Register 801 is transferred in parallel to three Shift Registers 812, 813, and 814 from which they may be read out serially on Lines 815.

It will be noted that the Drum Control Unit 405 of FIG. 9 is arranged to handle 63, 64, and 256 word blocks on both transfer-in and transfer-out operations. The 63 word blocks are transferred to and from local digital subscribers via Assembler Store 706 (FIG. 8) in the manner hereinabove described. On interoffice calls, an additional word is added to the sixty-three bit blocks by the cyclic code generator detector 816. This word is an error detection word which is recorded on the drum unit along with the message block. The generation and use of such cyclic error detection codes is described in greater detail in the copending application of H. A. Helm, Ser. No. 132,925, filed Aug. 21, 1961, since matured into U.S. Patent 3,273,119, granted Sept. 13, 1966, and assigned to applicants' assignee. A Cyclic Code Buffer Register 817 is used to store the words recorded on the drum unit for the computation of the appropriate error detection word.

In addition to the cyclic error detection code word at the end of each message block, there is an error detecting parity bit at the end of each word within the block. These parity bits may be generated and detected by Parity Bit Generator Detector 818.

There are also connected to the Control Circuits 808 a plurality of input control lines 818, a plurality of output control lines 819, and a plurality of status lines 820, all from control cable 619. These lines connect directly with the Control Circuits 708 in FIG. 8. The control lines to the Drum Control Unit 405 of FIG. 9 indicate the particular form of data then being transferred over the buses 614 and 615. These controls, of course, permit the registering of this data in the appropriate ones of Registers 801, 802, and 803.

The output control lines from Control Circuits 808 constitute requests for service, such as requests for a new data word to be recorded in the drum unit, requests to accept a new word read from the drum unit, or a request for a new instruction following the completion of the transfer of an entire message block.

The status lines 820 report to the Module Control Unit 402 of FIG. 8 the current status of the individual circuits of the Drum Control Unit 405 of FIG. 9, as well as of the drum unit associated therewith. The status of these circuits is, in turn, reported to the Central Processor 100 of FIGS. 1 and 2 and used to control the routing of messages to the various Message Store and Forward Modules.

Figure 10:
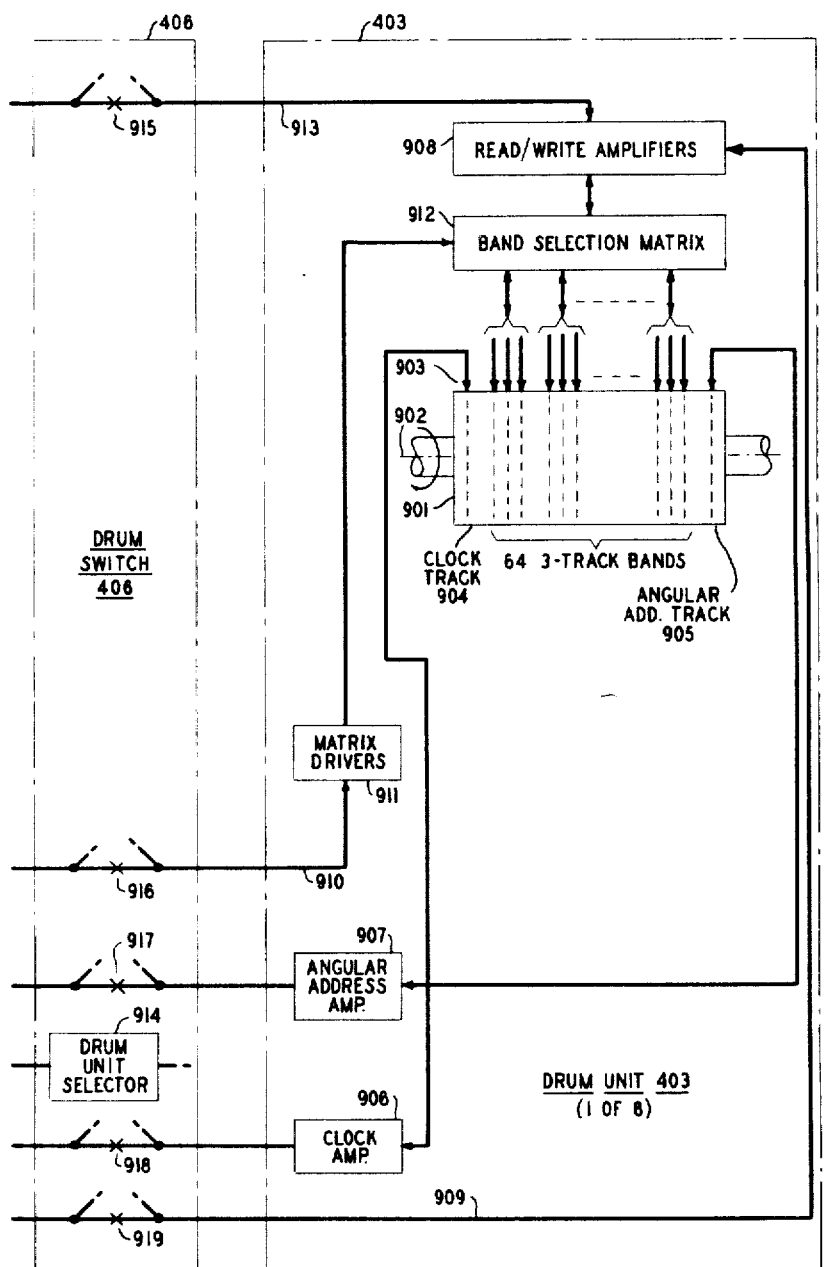
FIG. 10 is a detailed block diagram of a portion of the Drum Switch and a typical Drum Unit of a Message Store and Forward Module as shown in FIG. 2.

Referring then to FIG. 10 of the drawings, there is shown a portion of the Drum Switch 406 shown in FIG. 2 and Drum Unit 403, typical of any one of the Drum Units 509 through 511 shown in FIG. 5. The Drum Unit 403, in general, comprises a magnetic drum 901 arranged to be rotated about an axis 902 at a uniform rate. A plurality of read-write heads, such as head 903, define a plurality of tracks on the periphery of the drum. When the drum is rotated; each of these heads encompasses the corresponding track. As noted above, these tracks are divided into sixty-four, three-track bands and include, in addition, a clock track 904 and an angular address track 905. The clock track 904 has permanently recorded thereon a regular series of clock pulses which are amplified in clock amplifier 906 and used to synchronize the transfer of data into and out of Drum Unit 403.

The angular address track 905 has permanently recorded thereon digital codes identifying the particular angular word locations on the periphery of the drum. These codes for angular addresses are applied to Angular Address Amplifier 907 to be recorded in Angular Address Buffer Register 807 in FIG. 9. As was hereinbefore described, these angular addresses are compared with angular addresses received from the Module Control Unit 402 of FIG. 8. Matches in these addresses permit transfer operations by the enablement of Read-Write Amplifiers 908 via control line 909. The band number address signals, decoded by Band Number Decoder 804 in FIG. 9, and appearing on lines 910, are applied to Matrix Drivers 911 which, in turn, control Band Selection Matrix 912 to enable the three read-write heads associated with the selected band.

It can be seen that the band number address and the angular address, in combination, uniquely define each word position on the surface of drum 901. These addresses always arrive together to permit the reading or writing of data words at the particular word location. These data words, appearing on lines 913, are derived from the three Shift Registers 812, 813, and 814 of FIG. 9 by way of output leads 815. Each lead is applied to one of the read-write heads of the selected band. The data appears on these leads in serial form in synchronism with the rotation of the drum 901 to permit the writing of this data in the selected word location. During transfers from the drum 901, the operation is reversed. The selected word location is read by the read-write heads and the data therein appears serially on lines 913 to be entered into the Shift Registers 812, 813, and 814 in FIG. 9.

The Drum Switch 406 includes a Drum Unit Selector 914 which receives the decoded drum unit address from Decoder 809 in FIG. 9. Selector 914 selects the appropriate Drum Unit 403 by selectively enabling the appropriate ones of switching elements 915 through 919. The switching elements 915 through 919 are, for convenience, shown as mechanical contacts. Due to the rapid switching action required, however, they may comprise, in an actual embodiment, electronic switches of the transistor, diode or vacuum tube type. Since such switches are well known in the art, they will not be further described here.

Figure 11:
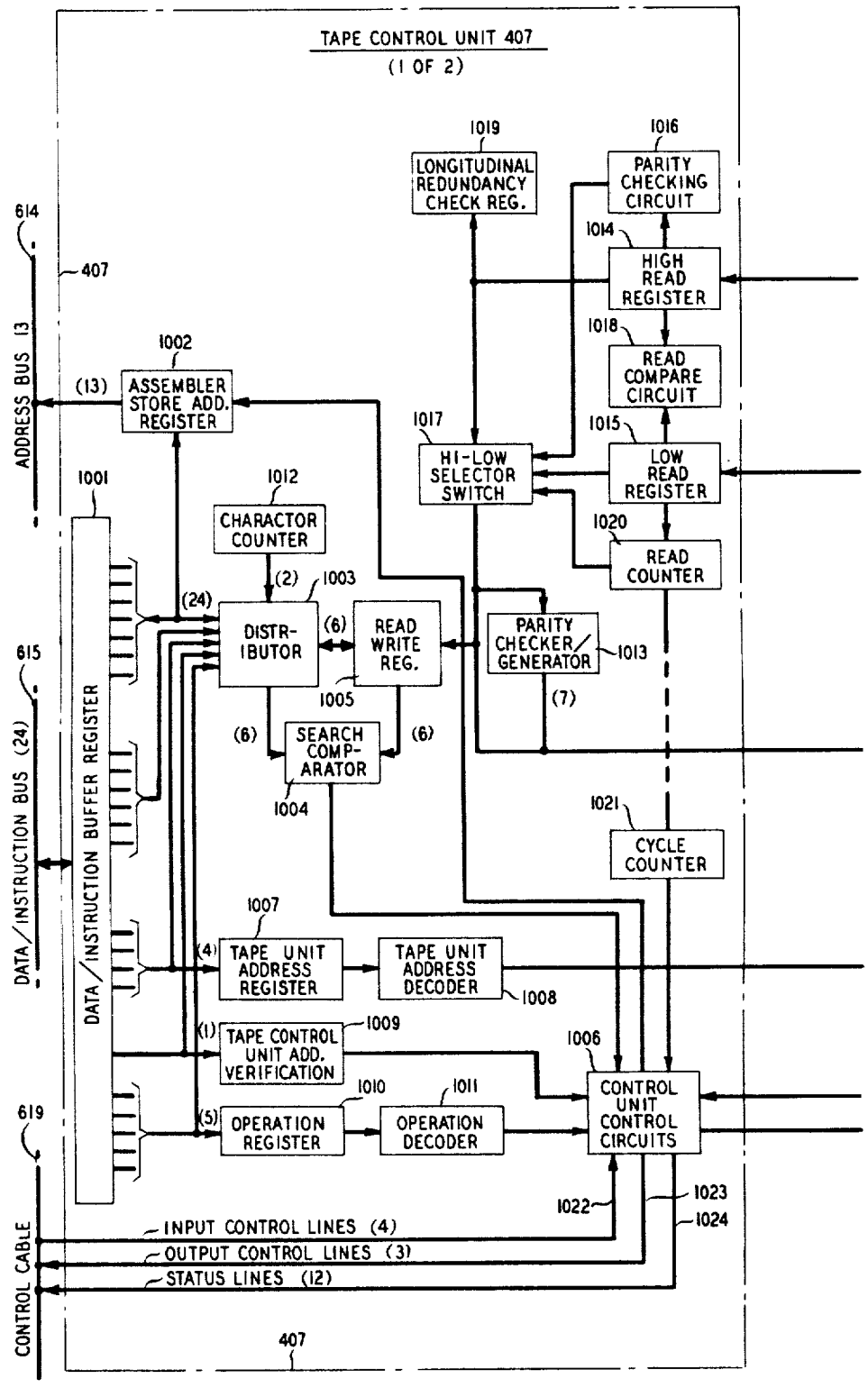
FIG. 11 is a detailed block diagram of a typical Tape Control Unit of a Message Store and Forward Module as shown in FIG. 2.

In FIG. 11, there is shown a Tape Control Unit 407 which is suitable for any of the tape control units shown in FIG. 4. These tape control units each comprise a Data Instruction Buffer Register 1001 and an Assembler Store Address Register 1002. Buffer Register 1001 is connected to Data Instruction Bus 615 and receives instruction and data words from the Module Control Unit 402 of FIG. 8 by way of Bus 615. It will be noted that, unlike the Drum Control Unit 405 of FIG. 9, data words and instruction words are received in the same Register 1001 rather than in separate registers. In most other respects, however, the operation of the Tape Control Unit 407 of FIG. 11 is quite similar to that of the Drum Control Unit 405 of FIG. 1.

Instruction words arriving at Data Instruction Buffer Register 1001 each include twenty-four bits, the first seven of which represent the coded address of a message block in the Assembler Store 706 (FIG. 8). These bits are transferred to Assembler Store Address Register 1002 and are then supplied, via Address Bus 614, to Tape Transfer Address Register 703. Register 1002 has thirteen-bit positions in which the last six positions are left zero when an address transfer is made from Register 1001. Thereafter, with the transfer of each word to or from the tape unit, the Assembler Store Address Register 1002 is advanced by one to provide the address of the next word in the message block.

A record may comprise a search number recorded on tape or an entire block of message information. In instructions involving the transfer of blocks of message information, the next six bits of the instruction word in register 1001 comprise spare bit positions. If a search number is to be recorded on the tape, these six-bit positions plus the seven-bit positions discussed above comprise a thirteen-bit search number which is recorded on the tape as a single four-character record. When a search is to be conducted, these thirteen bits are supplied to Distributor 1003 which, in turn, supplies them to Search Comparator 1004. Meanwhile, search numbers read from the Tape Unit are stored in Read-Write Register 1005 and are likewise supplied to Search Comparator 1004. When four successive matched characters are found in Comparator 1004, a signal is applied to Control Circuits 1006 to indicate this fact.

The next four bits of the instruction word in Data Instruction Buffer Register 1001 comprises the address of the particular tape unit to participate in the transfer. These four bits are applied to the Tape Unit Address Register 1007 and, in turn, supplied to Tape Unit Address Decoder 1008. The output of Decoder 1008 is utilized to secure the selection of the appropriate tape unit.

The next bit of the instruction word in Register 1001 comprise the address of the particular Tape Control Unit to be used in the transfer. It will be recalled that two Tape Control Units are supplied in each Message Store and Forward module (see FIG. 4). These two Tape Control Units are distinguished by means of a one-bit code. This code is applied to Tape Control Unit Address Verification Circuit 1009 which, upon recognizing the encoder address as being this control unit, passes an enabling signal to Control Circuits 1006.

The next five bits of the instruction word in Register 1001 comprise an encoded representation of the particular operation to be carried out by the Tape Control Unit 407. The five-bit code is stored in Operation Register 1010, decoded by Operation Decoder 1011 and used in Control Circuits 1006 to implement the appropriate operation. These operations include the following:

(1) Rewind;
(2) Advance one record;
(3) Reverse one record;
(4) Search forward;
(5) Record search number;
(6) Read block; and
(7) Write block.

The last digit of the instruction word stored in Register 1001 is a parity bit and may be used to detect errors in received instructions.

Following the receipt of instructions by Data-Instruction Buffer Register 1001, there will normally arrive the first data word involved in a message block transfer. Assuming that the transfer involves the writing of the message block into the tape unit, this data word is supplied from Data Instruction Bus 615 and stored in Register 1001. The twenty-four bits of data stored in Register 1001 are supplied, six at a time, to Read-Write Register 1005 by way of Distributor 1003. Distributor 1003 comprises a six-pole, four-position electronic switch controlled by Character Counter 1012 and operated in synchronization with the operation of the tape unit. Each six bit character recorded in Read-Write Register 1005 is supplied with a seventh parity bit by Parity Checker-Generator 1013. The resulting seven bit character is supplied to the tape unit for recording on seven parallel channels of the magnetic tape.

On transfers from the tape unit to Register 1001, two separate signals are provided by the tape unit; one to High Read Register 1014, and the other to Low Read Register 1015. These two signals are derived from the same tape reading heads, and are the result of clipping these signals at different amplitude levels. The High Read Register signals are clipped at a higher amplitude level than the Low Read Register signals. Since the signals clipped at a higher amplitude level are inherently more immune to errors due to noise, these signals are used whenever possible. Thus, a Parity Checking Circuit 1016 checks the parity of the character stored in High Read Register 1014. If the parity of this character is correct, Checking Circuit 1016 operates the High-Low Selector Switch 1017 so as to pass the character from the High Read Register 1014 to Read-Write register 1005. If the parity of the character from High Read Register 1014 is not correct, High-Low Selector Switch 1017 is arranged to transfer the character from Low Read Register 1015 to Read-Write Register 1005.

In addition to the above, a regular comparison of the characters in High Read Register 1014 and Low Read Register 1015 is made by the Read Comparator Circuit 1018. The results of this comparison provide one of the status signals from Tape Control Unit 407 and are periodically checked to monitor the proper operation of the tape unit. Continual discrepancies between two characters, for example, might indicate the faulty operation of the associated tape unit and require its withdrawal from service for trouble shooting maintenance.

In addition to the parity check on each seven bit character, longitudinal redundancy check is also provided for each channel on the tape unit. Parity characters are generated by the Parity Check Generator 1013 during the write-in transfer and are checked by Longitudinal Redundancy Check Register 1019 during the read-out operation.

The Read Counter 1020 is a three-stage counter used to time the operation of the High-Low Selector Switch 1017. The Cycle Counter 1021 is an eleven-stage counter and is used to generate the basic timing information required for the operation of the tape system. Cycle counter 1021 and Read Counter 1020 are used in combination for this purpose and the timing signals thus generated are supplied to Control Circuit 1006.

In addition to the parallel binary coded words appearing on Buses 614 and 615, control signals are also carried by Control Cable 619 to and from the Tape Control Unit 407. Input control lines 1022 carry instructions from the Module Control Unit 402 of FIG. 8 to the Tape Control Unit 407 to indicate whether the transfer is into or out of the tape unit as well as to control the resetting of all of the instruction word and status registers. Output control lines 1023, from Control Circuits 1006, carry requests for new instructions, requests for new data words and indicate readiness to transfer data to the Assembler Store 706. The Status of the circuits of the Tape Control Unit 407, error indicators, and the status of the connected tape unit are all indicated by means of individual status lines 1024. These status indicators are regularly supplied to the Module Control Unit 402 of FIG. 8 and stored in the status portion of Assembler Store 706. From there they may be transferred to the Central Processor 100 when required.

Figure 12:
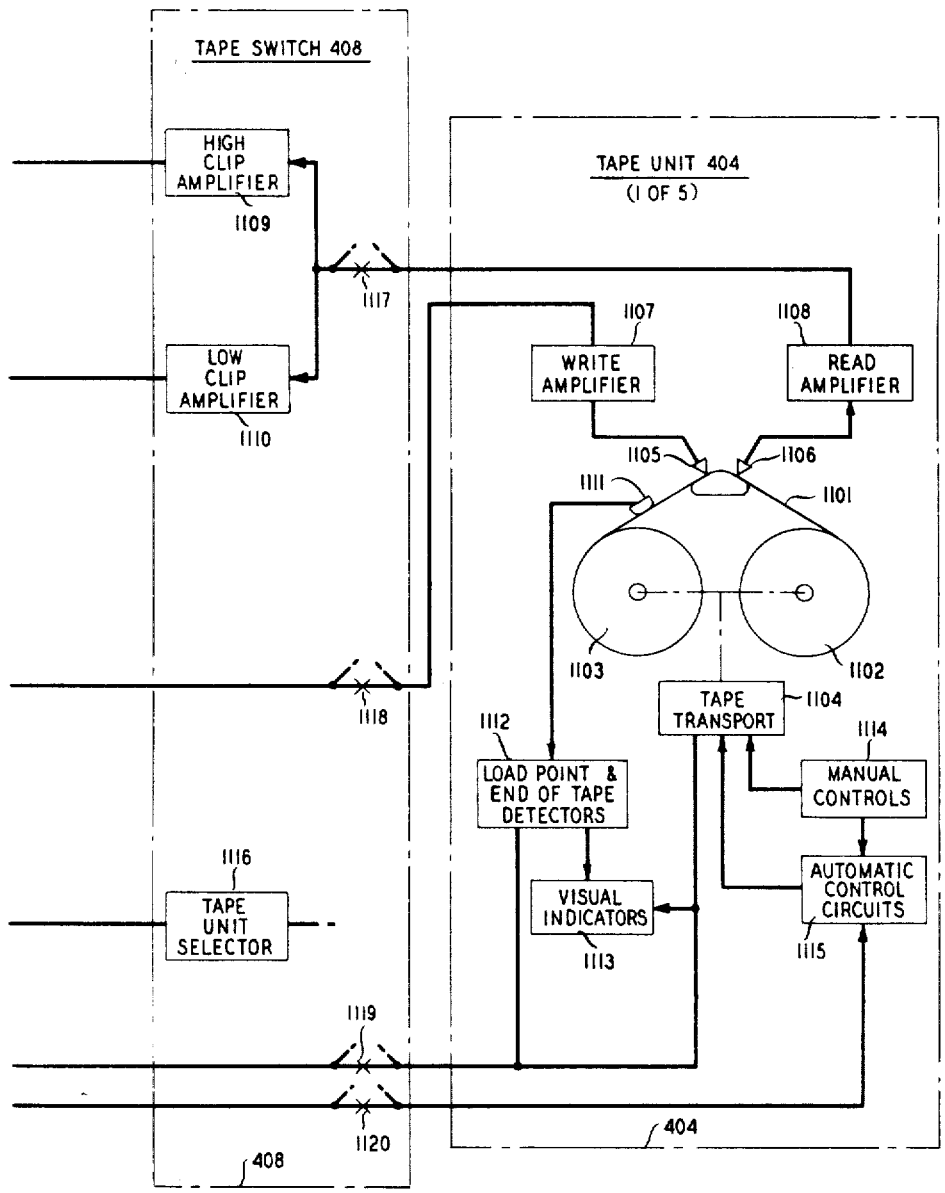
FIG. 12 is a detailed block diagram of a portion of the Tape Switch and a typical Tape Unit of a Message Store and Forward Module as shown in FIG. 2.

Referring now to FIG. 12, there is shown a portion of the Tape Switch 408 shown in FIG. 1 and a typical Tape Unit 404 which may be used for any one of the tape units illustrated in FIG. 5. The Tape Unit 404 comprises magnetic tape 1101 together with storage reels 1102 and 1103, their associated tape transport apparatus 1104, a set of seven write heads 1105 and a corresponding set of seven read heads 1106.

As is conventional with such units, the width of the tape 1101 is divided into a plurality of channels over each of which is positioned one of the write heads 1105 and one of the read heads 1106. Signals to be written on to the tape are applied to write amplifier 1107 and thence to write heads 1105. Similarly, signals read from the tape by read heads 1106 are applied to read amplifier 1108. The Tape Unit 404 is capable of "read during write" operation to provide a check on the accuracy of recorded characters.

The tape switch 408 includes High Clip Amplifier 1109 and Low Clip Amplifier 1110. It is these amplifiers which provide the high-read characters and low-read characters described in connection with FIG. 11. The output of Read Amplifier 1108 is applied to both High Clip Amplifier 1109 and Low Clip Amplifier 1110.

As is conventional with tape recording systems of this type, a Detector 1111 is provided to detect special markers near the front (load point marker) and near the end (end of tape marker) of the tape. These markers are detected by detector 1111 and recognition signals applied to detector circuit 1112, and thence to Control Circuits 1006 in FIG. 11. Visual indicators 1113 provide visual indications of the detection of these marks.

As is also conventional in such tape units, a plurality of manual controls 1114 are provided for the conventional tape operations such as on, off, rewind, back, forward, stop, fast forward, et cetera. These manual controls may be used to control the tape transport apparatus 1104 directly. In addition, a program control switch is provided in manual controls 1114 to enable the tape transport apparatus 1104 to be controlled by automatic control circuits 1115. Automatic control circuits 1115, in turn, are controlled by Control Circuits 1006 in Tape Control Unit 407 in FIG. 11.

The Tape Switch 513 is provided with a Tape Unit Selector 1116 to which there are applied the decoded output from Tape Unit Address Decoder 1008 in FIG. 11. As can be noted in FIG. 5, up to eight tape units are provided in each Message Store and Forward Module. Tape Switch 408 is used to selectively interconnect Tape Control Unit 407 to any one of these eight tape units, or to any one of the tape units in any other Message Store and Forward Module. These connections are made by way of switching contacts illustrated schematically by elements 1117 through 1120. For convenience, the switching contacts are illustrated in FIG. 12 as mechanical switch contacts. In an actual implementation of the present invention, fast-acting electronic switches of types well known to the art would actually be used for this purpose.

Having described in detail the components of a typical Message Store and Forward Module, it is well to review the overall operation of these Modules. On incoming messages, for example, the arrival of the message at the Time Division Switch 300 (FIG. 1) is recognized at the Central Processor 100 which selects an appropriate Message Store and Forward Module for the storage of that message. Central Processor 100 then generates an appropriate sequence of instruction words for transfer to Message Store and Forward Module 400 to enable the assembly of messages into blocks and the transfer of completed data blocks on a particular data line to particular locations in a particular drum or tape unit. These selections are made on the basis of idle-busy status records maintained current in Call Store System 170.

As noted in connection with FIG. 8, a portion of the instruction from Central Processor 100 comprises the address of the particular digital line over which the message is to be received. This address is applied to Instruction and Data Register 702 in FIG. 8 and thence to Address Bus 614. The address is registered in Line Unit Address Register 617 (FIG. 7) and decoded in Decoder 618 to enable the addressed input and output line units. The input line unit may now receive digital data from the Time Division Switch 300 under the control of a clock signal from a central source of timing.

At the same time, a further portion of the instruction is transferred via Instruction and Data Register 702, Data Instruction Bus 615, Main Buffer Register 716 and Read-in Circuit 707 to the instruction queue maintained at specified portion of Assembler Store 706. The appropriate address in Assembler Store 706 is received from Central Processor 100 over Call Store Address Bus 453, registered in Address and Mode Register 701 and transferred via Address Bus 614 to Assembler Store Address Register 703. This address is decoded in Assembler Store Address Decoder 715 and used to enable Read-in Circuit 720 to write the instruction word into the appropriate section of Assembler Store 706.

When, in the course of its operation, based on the requests for work from the Service Selector 714, the Module Control Unit 402 of FIG. 8 arrives at this instruction, the address thereof is again read into Register 703 and used by Assembler Store Address Decoder 715 to address this location in Assembler Store 706. At this time, however, the instruction is read out of Assembler Store 706 by Read-out Circuit 721 and transferred to Main Buffer Register 716; the instruction word is then transferred to Order Register 718. Appropriate portions of this instruction are decoded by Order Decoder 719 and applied to Control Circuit 708 to control the assembly of message blocks in Assembler Store 706.

When a character (more than one and fewer than twenty-three bits) has been received by the addressed input line unit of FIG. 7, the Input Line Unit Scanner 613 transfers a request for service by way of Control Cable 619 to Service Selector 714. When the Module Control Unit of FIG. 8 has worked its way through the previous requests for service and comes to this request, the line unit address generated by the Control Circuits 708 is transferred to Line Unit Address Register 617, decoded by Decoder 618 and used to enable the input line unit of the addressed line. This same address is also gated to Assembler Store Address Register 703, since the same address code forms the address in Assembler Store 706 of the instruction word location assigned for the addressed input line. This address is decoded by decoder 715 and used to enable the appropriate word location in Assembler Store 706 and read out the stored instruction word through the Read-out Circuits 721 to the Main Buffer Register 716 and then to Order Register 718. The instruction word is indexed and modified in preparation for subsequent work on the addressed input line unit and then stored in the same location in Assembler Store 706 through the Read-in Circuits 720. The instruction word contained in Order Register 718 is decoded by Order Decoder 719 to control the operation of the Control Circuits 708. A portion of the instruction word defines the current address of the Assembler Store 706 within the locations assigned for input block assembly for this given input line. This address is transferred to Assembler Store Address Register 703, decoded by Assembler Store Address Decoder 715, and used to read out the appropriate word location to the Main Buffer Register 716 through Read-out Circuits 721. The character assembled on the addressed input line unit of FIG. 7 is transfererd by way of Data-Instruction Bus 615 to the Main Buffer Register 716 where it is added to the contents of this register and transferred to the location from which the word was previously read in the Assembler Store 706 through Read-in Circuits 720.

The above-described process is continued, a character at a time, until the entire sixty-four word message block is assembled in Assembler Store 706. The next message data to arrive on the input message line is assembled in a similar manner in a second block location in Assembler Store 706. While the second message block is being assembled, the first message block is transferred to an appropriate drum unit. This is accomplished in the following manner.

An instruction word arriving by way of Call Store Write Data Bus 455 is registered in Instruction and Data Register 702 and is transferred to a drum instruction queue in Assembler Store 706 and thence by way of Data Instruction Bus 615 to Drum Address Register 802 in FIG. 9. This instruction, originating at the Central Processor 100, identifies the particular drum unit and message block location on that drum unit to which the incoming message is assigned.

The assigned drum unit is prepared for the reception of the message block by the drum address in Drum Address Register 802. That is, an appropriate Drum Control Unit, Drum Unit, band number and angular address on the drum form parts of the drum address in Register 802, and are used to enable the writing circuits to that drum location.

When the drum unit has been prepared for the reception of the message block, appropriate message block addresses which have been registered in Assembler Store Address Register 803 are transferred by way of Address Bus 614 to Drum Transfer Address Register 704 and thence to Assembler Store Address Register 703 (FIG. 8). This address is decoded by Assembler Store Address Decoder 715 and used to address the appropriate word location of the first word of that message block in Assembler Store 706. The word stored therein is read out by read-out circuits 721 to Main Buffer Register 716 and transferred by way of Data Instruction Bus 615 to Data Buffer Register 801 of FIG. 9. This word is, in turn, transferred to Shift Registers 812, 813, and 814 and serially read out from these shift registers to the Read-Write Amplifiers 908 in FIG. 10 and recorded at the proper angular location of the selected band of Drum 901.

When this transfer has been completed, the address stored in Assembler Store Address Register 803 is advanced by one and the new address transferred by way of Address Bus 615 and Drum Address Register 704 to transfer the next word from Assembler Store 706 to Data Buffer Register 801 of FIG. 9. This word is, in turn, transferred to Shift Registers 812, 813, and 814, serially read out from these shift registers to the Read-Write Amplifiers 908 in FIG. 10 and recorded at the proper angular location of the selected band of Drum 901. In this manner, successive words in the message block are transferred from Assembler Store 706 to Drum 901, the appropriate parity bits and cyclic code bits being added after each word and at the end of the message block.

Transfers to a Tape Unit take place in an analogous manner and will not be described in detail. It should be noted, however, that the only incoming messages transferred directly to a tape unit will be facsimile messages. All other transfers to tape units take place from a drum unit in the same Message Store and Forward Module.

When the switching center of FIGS. 1 and 2 is prepared to transfer the message thus stored to its destination or destinations, when for example, the called subscriber or trunk facilities become available, an appropriate instruction word is generated by Central Processor 100 to transfer the message blocks, one at a time, from the message store and forward module to a selected trunk or line. This instruction is transferred by way of Instruction and Data Register 702 (FIG. 8) to the appropriate Drum Unit by way of Data Instruction Bus 615, and stored in Drum Address Register 802 (FIG. 9). This address is used, as before, to select the appropriate drum and to enable the proper band and angular word position on the drum where the first word of the first message block is recorded. The message block transfer takes place at this time between the drum unit at that portion of the Assembler Store 706 assigned to output messages for the selected digital line. The entire message block is transferred to Assembler Store 706 in much the same way as the transfer took place in the opposite direction.

Following the storage of the first message block in Assembler Store 706, a second message block is transferred in the same way to another location in Assembler Store 706 from the Drum Unit. While the second message block is being transferred, however, the first word of the first message block is transferred, a character at a time, to the output line unit in FIG. 7 associated with the selected output line. This output line unit transmits the first message word, a character at a time, to the selected output line, under the control of clock signals from a central source of timing. When the first word has been transmitted in this manner, a second word is transferred, a character at a time, from Assembler Store 706 to the Output Line Unit of FIG. 7. In this connection, it will be noted that the line units of FIG. 7 all have a capacity for storing two characters of both input and output messages. A second character is therefore stored in the line unit while the first character is either being transmitted out on an output line or being transferred to the Assembler Store 706 on incoming messages.

Following the transfer of the first message block from Assembler Store 706 through the output line unit to the selected output line, the second message block, which has, in the meantime, been transferred to Assembler Store 706, may be transferred out in the same manner from Assembler Store 706, through the output line unit, to the selected output line.

It can be seen that the Message Store and Forward Modules described herein are capable of receiving large numbers of digital messages, storing them and transmitting them out at a later time. Each Module is adapted to handle a plurality of input and output message lines at the same time, each one processing a word, a character, or a block at a time by the queued instructions in Assembler Store 706.

A transfer from a drum unit to tape unit in the same Message Store and Forward Module takes place in much the same manner as the above described transfers to and from Assembler Store 706. In order to speed up this operation, however, and to require less supervision by the control circuitry, messages are transferred from the drum to the tape unit and back in 256-word message blocks rather than 64-word message blocks. These transfers however, take place in much the same way, by way of Data Instruction Bus 615, between Data Instruction Buffer Register 1001 (FIG. 11) and Data Buffer Register 801 (FIG. 9).

The message records stored on Tape Unit 404 in FIG. 12 are identified by search numbers recorded on the tape preceding the identified message record. It is these search numbers which are located, by way of search comparator 1004, during the retrieval of a message record from the tape unit. When a message record is written into the tape 1101, the search number in the first thirteen bit positions of Data Instruction Buffer Register 1001 is written on the tape as a four character block preceding the recording of the message record itself.

The above described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A signal switching system comprising, in combination, a plurality of analog subscriber lines and trunks, a plurality of digital subscriber lines and trunks, first switching means for selectively interconnecting said analog lines and trunks, second switching means for selectively interconnecting said digital lines and trunks, analog-digital converting means interconnecting at least one of said analog trunks and one of said digital trunks, means connected to at least one of said digital trunks for storing digital messages and forwarding said digital messages at a later time to said one of said digital trunks, single central data processing means having its operation divided into successive cycles of time slots, each of said time slots being utilized to control said first or second switching means or said digital message store and forward means, means for returning information to said central data processing means during selected time slots and concerning the operation of said switching means and said store and forward means, and means for transmitting instructions from said central data processing means during selected time slots to said switching means and said store and forward means for the control thereof.

2. A signal switching system comprising, in combination, a plurality of analog subscriber lines and trunks, a plurality of digital subscriber lines and trunks, space division switching means for selectively interconnecting said analog subscriber lines and trunks, time division switching means for selectively interconnecting said digital subscriber lines and trunks, digital message store and forward means connected to said time division switching means, said store and forward means including means for assembling digital messages from calling subscribers into uniformly-sized blocks and storing said blocks for later transmission to called subscribers, and single program-controlled central data processing means for controlling said space division switching means and said time division switching means and said store and forward means.

3. In a signal switching system, time division switching means for selectively interconnecting calling and called digital subscribers, means connected to said time division switching means for assembling messages from said calling subscribers into uniformly-sized message blocks and storing said message blocks, and means for later transmitting the stored message blocks to said called subscribers through said time division switching means.

4. In a signal switching system, a plurality of subscriber lines and trunks, means for storing messages from said lines and trunks and later transmitting said messages to other lines and trunks, and time division switching means for interconnecting said subscriber lines and trunks and said storing means, said storing means comprising a plurality of identical modules, each said module comprising means for assembling said messages into uniformly-sized blocks, recording media, means for recording each said block on said media when assembled, means for reading said message blocks from said media, and means for retransmitting each said message block to said time division switching means when read.

5. The combination according to claim 4 further including further switching means interconnecting said storage media in all of said modules with the said recording and transmitting means in all said modules, and means for selectively controlling said further switching means.

6. A signal switching system comprising, in combination, a plurality of subscriber lines and trunks, switching means for selectively interconnecting said lines and trunks, message store and forward means connected to at least one of said trunks, single common control means for controlling said switching means, said message store and forward means comprising a plurality of line units connected to said switching means, a plurality of message storage units, assembler storage means, means for assembling messages arriving at said line units in uniformly-sized blocks in said assembler storage means, means for transferring each block when thus assembled to one of said message storage units, means for retransmitting said message blocks at a later time from said one message storage unit to said assembler storage means, and means for disassembling said message blocks in said assembler storage means, and means for transmitting the disassembled message to said line units for transmission to said switching means.

7. The signal switching system according to claim 6 wherein each of said line units includes buffer storage means, said buffer storage means including means for registering a plurality of serial message bits as multibit characters, and means for transmitting each said multibit character, when registered, to said assembler storage means.

8. The signal switching system according to claim 6 further including means for generating requests for service from each of said line units and each of said message storage units, means for queuing said requests for service in the order of their generation, means for storing said queued requests for service, and means for initiating a transfer between said assembler storage means and each said unit requesting service when that request has arrived at the first position in said queue.

9. The signal switching system acording to claim 6 wherein a subplurality of said message storage units comprise magnetic drums, means for selectively addressing each storage location of each of said drums, and means for transferring message blocks between selected storage locations of each of said drums and selected storage locations of said assembler storage means.

10. The signal switching system according to claim 9 further including a plurality of said transferring means, each said transferring means being operative to control transfers between said assembler storage means and any one of said magnetic drums.

11. The signal switching system according to claim 6 wherein a subplurality of said message storage units comprise magnetic tapes, means for selectively addressing each storage location of each of said tapes, and means for transferring message blocks between selected storage locations of each of said tapes and selected storage locations of said assembler storage means.

12. The signal switching system according to claim 11 further including a plurality of said transferring means, each said transferring means being operative to control transfers between said assembler storage means and any one of said magnetic tapes.

13. The signal switching system according to claim 11 further including means for transferring message blocks between selected storage locations of each of said tape units and selected storage locations of each of the remainder of said message storage units.

14. A signal switching system comprising program-controlled central call processing means, switching means, a plurality of subscriber lines, a plurality of message store and forward means, and means, under the control of said central call processing means, for selectively establishing, maintaining and terminating communication paths through said switching means between any of said subscriber lines and said store and forward means and between any of said subscriber lines and others of said subscriber lines.

References Cited

UNITED STATES PATENTS

| | | | |
|---|---|---|---|
| 2,952,732 | 9/1960 | Wright et al. | 178—2 |
| 2,955,165 | 10/1960 | Budlong et al. | 179—18.9 |
| 3,087,010 | 4/1963 | De Turk et al. | 178—2 |
| 3,110,773 | 11/1963 | Miller | 179—41 |
| 3,223,976 | 12/1965 | Abbott et al. | 340—172.5 |
| 3,241,125 | 3/1966 | Tomasulo et al. | 340—172.5 |
| 3,293,618 | 12/1966 | Klein | 340—172.5 |
| 3,302,182 | 1/1967 | Lynch et al. | 340—172.5 |
| 3,310,780 | 3/1967 | Gilley et al. | 340—172.5 |
| 3,334,191 | 8/1967 | Arseneau et al. | 179—27 |

PAUL J. HENON, *Primary Examiner.*

J. P. VANDENBURG, *Assistant Examiner.*